Patented Sept. 21, 1948

2,449,934

UNITED STATES PATENT OFFICE 2,449,934

MINERAL OIL COMPOSITION

John J. Giammaria, Woodbury, N. J., assignor to Socony-Vacuum Oil Company, Incorporated, a corporation of New York No Drawing. Application August 8, 1945, Serial No. 609,719

14 Claims. (Cl. 252—46.6)

This application is directed to improved mineral oil compositions and is a continuation-in-part of my copending application Serial No. 512,036, filed November 27, 1943, which has to do with a method of making phosphorus- and sulfur-containing organic reaction products. The latter products comprise the characterizing agents incorporated in the mineral oil compositions contemplated herein.

The present invention is predicated upon the discovery of a catalytic method for preparing phosphorus- and sulfur-containing organic reaction products. The method contemplated herein involves the reaction of a halogenated hydrocarbon, particularly a halogenated paraffin, and a phosphorus sulfide in the presence of a Friedel-Crafts catalyst at an elevated temperature, and also involves the removal thereafter of the Friedel-Crafts catalyst from the reaction mixture so formed to obtain the desired reaction product.

While all phosphorus sulfides, such for example as $P_2S_3$, $P_2S_5$, $P_4S_3$, $P_4S_7$, etc., are contemplated for use in the present method, $P_2S_5$ is particularly preferred.

With regard to the halogenated hydrocarbon reactant, chlorinated paraffins are preferred over the corresponding bromine, iodine and fluorine derivatives in view of the relative cost of the halogen substituents. It is to be understood, however, that all such halogen derivatives are contemplated herein. Other halogenated hydrocarbons such as aryl and aralkyl halides, etc., may also be used in the present method. Similarly, while halogenated paraffins having low molecular weight aliphatic or alkyl groups are suitable for use herein, those having relatively high molecular weight alkyl groups are preferred. For example, low molecular weight alkyl halides such as methyl, ethyl, propyl, butyl, amyl, etc., chlorides may be used. As aforesaid, however, preference is given to the relatively high molecular weight paraffin derivatives, representative of which are those having eighteen or more carbon atoms in the molecule. Typical of the preferred alkyl halides are those known in the art as the "halowaxes" or "wax halides," which are obtained by the halogenation of wax. For example, petroleum wax, which is a paraffin hydrocarbon obtained from petroleum and which contains at least eighteen carbon atoms in the molecule, can be chlorinated to various degrees to obtain several chlorine-substituted waxes, such as monochlorowax, dichlorowax, etc. Preference is given to chlorowaxes obtained by chlorination of a petroleum wax having a melting point of about 50° C. and about 24 carbon atoms per molecule, the chlorowaxes preferably containing 10 per cent to 17 per cent by weight of chlorine. Particular preference, however, is given to those individual chlorowaxes such as monochlorowax and dichlorowax, which are obtained by chlorinating a petroleum wax and separating the individual constituents—unchlorinated wax, mono-chlorowax, dichlorowax, etc.—from each other by such a method as fractional crystallization from suitable solvents, typical of which is acetone. It will be obvious that a mixture of reaction products will be obtained when a crude chlorowax containing free wax, monochlorowax and polychlorowaxes is used in the present method. Other relatively high molecular weight alkyl halides which may be used in the present method include halogenated "slack waxes," halogenated "foots oil" and halogenated residual oil stocks of highly paraffinic nature. By way of elaboration, "slack waxes" are known in the art as hydrocarbon fractions comprising petroleum waxes in combination with hydrocarbon oils; and "foots oils" are typified by that hydrocarbon fraction obtained by isolating wax from slack wax.

All Friedel-Crafts catalysts such as $AlCl_3$, $BF_3$, $FeCl_3$, $ZnCl_2$, etc., are effective in the present method, but $AlCl_3$ is most efficient and, for this reason, is preferred. The amount of catalyst used can be varied considerably; however, from about one to two per cent by weight of the alkyl halide is satisfactory.

The proportions of the reactants—phosphorus sulfide and alkyl halide—may also be varied over a wide range. With the preferred sulfide, $P_2S_5$, satisfactory results have been obtained by using substantially ¼ mol of $P_2S_5$ for each atom of halogen in the alkyl halide. In this regard, however, particularly desirable results are obtained by reacting substantially one mol of $P_2S_5$ with four mols of a monochlorowax and one mol of $P_2S_5$ with two mols of a dichlorowax.

Temperature is an important consideration in the present method. The reaction proceeds most efficiently and the phosphorus- and sulfur-containing reaction products obtained thereby are particularly valuable, as will be explained hereinafter, when reaction temperatures of from about 150° C. to about 200° C. are used. Although the foregoing elevated temperatures are preferred, reaction temperatures as low as about 125° C. and as high as about 250° C. are satisfactory herein, the reaction temperature being influenced somewhat by the reaction time and amount of catalyst used.

With regard to reaction time, it is considered that comparatively short reaction times are most satisfactory in the present method. For example, reaction times of several hours as 4 to 7 hours are particularly preferred with quantities of reactants and reaction conditions in the illustrative examples provided hereinafter.

The phosphorus- and sulfur-containing organic reaction products obtained as described above are acidic in nature, as evidenced by their neutralization numbers (N. N.), and, therefore, can be readily converted to their corresponding ammonium, amine and metal salts. The said reaction products are further characterized by the presence of a relatively small amount of halogen, as chlorine. Generally, the amount of chlorine, for example, will vary from about 0.1 to about 2.0 per cent, depending upon the reaction conditions. It has been found that greater amounts of ammonium, amine and metal groups can be introduced into said reaction products than is indicated by their neutralization numbers. For example, the metal salts of said reaction products can be formed by reacting said reaction products with metal hydroxides or alcoholic solutions of metal oxides. They may also be prepared by reaction of alkali metals with said reaction products to form the corresponding alkali metal salts, and the latter salts may be converted to salts of different metals by metathesis with organic or inorganic salts of the desired metal. Other methods for forming such salts of the aforesaid reaction products will be apparent to those familiar with the art.

The novel method contemplated herein is illustrated by the following specific examples:

EXAMPLE 1

(a) REACTION MIXTURE

|  | Grams |
| --- | --- |
| Monochlorowax (9.6% Cl) | 150 |
| $P_2S_5$ | 22.5 |
| $AlCl_3$ | 1.5 |

(b) PROCEDURE

A paraffin wax of approximately 24 carbon atoms per molecule and having a melting point of about 50° C. was chlorinated with chlorine gas at about 100° C. until 10 per cent by weight of chlorine was introduced. The chlorinated wax was blown with a stream of $N_2$ to remove entrained hydrogen chloride and uncombined chlorine. It was then filtered at 80–85° C. to remove unchlorinated wax. The filtrate was dissolved in 7 volumes of acetone and the resulting solution was chilled to −15° C. Monochlorowax precipitated at this temperature and was filtered with the temperature maintained at −15° C. The monochlorowax was then melted and heated such that any entrained acetone was distilled off. The product was pure monochlorowax containing 9.6% chlorine.

The monochlorowax and $P_2S_5$ were heated to 100° C. and $AlCl_3$ was added thereto. The temperature was gradually raised to 200° C. and maintained thereat for four hours. The reaction mixture was then cooled to about 80° C., diluted with benzol and washed with dilute HCl, followed by water until the water-washings were free of aluminum. The product was then distilled to remove benzol and thereby obtain the desired phosphorus- and sulfur-containing organic reaction product (product I) which had a neutralization number (N. N.) of 18.

(c) BARIUM SALT OF (b)

The barium salt of the phosphorus- and sulfur-containing reaction product obtained in (b) was prepared by reacting 25 grams of $Ba(OH)_2.8H_2O$ with a benzol solution of said reaction product. The reaction mixture so obtained was heated gradually to 150° C., whereupon benzol and water formed in the reaction were distilled off. The benzol- and water-free reaction mixture was then filtered to obtain the desired barium salt. On analysis the barium salt (product II) was found to contain: 3.95% phosphorus, 5.90% sulfur, 0.36% chlorine and 5.37% barium.

EXAMPLE 2

(a) REACTION MIXTURE

|  | Grams |
| --- | --- |
| Crude chlorowax (14% Cl) | 200 |
| $P_2S_5$ | 44 |
| $AlCl_3$ | 2 |

(b) PROCEDURE

Crude chlorowax (14% Cl)—containing free wax, monochlorowax and polychlorowaxes—and $P_2S_5$ were heated to 100° C. Aluminum chloride was then added and the resultant reaction mixture was heated at 200° C. for seven hours. The reaction mixture was worked up as described in Example 1 (b) to obtain the phosphorus- and sulfur-containing organic reaction product (product III) which had a neutralization number (N. N.) of 30.

(c) BARIUM SALT OF (b)

The barium salt of the reaction product obtained in (b) was prepared by reacting said reaction product with 32 grams of $Ba(OH)_2.8H_2O$ as described in Example 1 (c). This salt (product IV) analyzed as follows: 4.58% phosphorus, 8.72% sulfur, 0.96% chlorine and 6.60% barium.

EXAMPLE 3

(a) REACTION MIXTURE

|  | Grams |
| --- | --- |
| Crude chlorowax (14% Cl) | 140 |
| $P_2S_5$ | 31 |
| $AlCl_3$ | 1.4 |

(b) PROCEDURE

Phosphorus pentasulfide was added to the crude chlorowax followed by the addition of $AlCl_3$. The mixture was gradually heated to 200° C. and maintained at that temperature for seven hours. Then, the mixture was cooled, diluted with benzol, filtered and the filtrate reacted directly with 25 grams of $Ba(OH)_2.8H_2O$ to form the barium salt of the phosphorus- and sulfur-containing reaction product formed in the previous reaction at about 200° C.

The reaction mixture containing said salt was worked up as described in Example 1 (c). This salt (product V) contained: 5.03% phosphorus, 9.7% sulfur, 1.74% chlorine and 7.72% barium.

EXAMPLE 4

(a) REACTION MIXTURE

|  | Grams |
| --- | --- |
| Crude chlorinated wax (17% Cl) | 200 |
| $P_2S_5$ | 52 |
| $AlCl_3$ | 2 |

(b) PROCEDURE

The reactants and catalyst in (a) were treated as described in Example 3 (b). The reaction product (product VI) thus obtained contained phosphorus and sulfur, and had a neutralization number (N. N.) of 37.

(c) BARIUM SALT OF (b)

A benzol solution containing the reaction product obtained in (b) was treated with 50 grams of $Ba(OH)_2.8H_2O$ to form the barium salt of said reaction product, and said barium salt was isolated by the procedure shown in Example 1 (c).

The salt (product VII) thus obtained contained: 5.69% phosphorus, 6.70% sulfur, 0.98% chlorine and 10.28% barium.

EXAMPLE 5

(a) Reaction Mixture

| | Grams |
|---|---|
| Chlorinated foots oil (10.6% Cl) | 200 |
| $P_2S_5$ | 33 |
| $AlCl_3$ | 2 |

(b) Procedure

A foots oil having a pour point of 85° F., an A. P. I. gravity of 35.6, Saybolt Universal viscosity of 36.4 seconds at 210° F., flash point of 350° F. and fire point of 405° F. was chlorinated as described in Example 1 (b) and the chlorinated product thus obtained contained 10.6% Cl.

The chlorinated foots oil, $P_2S_5$ and $AlCl_3$ were reacted, and the reaction mixture worked up, as described in Example 1 (b). The reaction product (product VIII) contained phosphorus and sulfur.

(c) Barium Salt of (b)

A benzol solution of the reaction product obtained in (b) was treated with 37 grams of $Ba(OH)_2.8H_2O$ as described in Example 1 (c), and the barium salt thus formed was isolated as described in Example 1 (c). The barium salt (product IX) thus obtained contained: 3.82% phosphorus, 6.90% sulfur, 1.12% chlorine and 7.88% barium.

EXAMPLE 6

(a) Reaction Mixture

| | Grams |
|---|---|
| Crude chlorinated wax (14% Cl) | 100 |
| $P_2S_5$ | 22 |
| $AlCl_3$ | 1 |

(b) Procedure

The reactants and catalyst in (a) were treated as described in Example 2 (b), and the reaction product (product X) thus obtained was acidic and contained substantial amounts of phosphorus and sulfur.

(c) Ammonium Salt of (b)

The reaction product obtained in (b) was diluted with benzol and the resulting benzol solution was blown with $NH_3$ gas to form the corresponding ammonium salt. The benzol was then distilled off and the ammonium salt (product XI) thus obtained analyzed as follows: 4.42% phosphorus, 8.90% sulfur and 0.80% nitrogen.

Inasmuch as the reaction products and their corresponding salts — ammonium, amine and metal — described above are believed to be new in the art, they are contemplated herein as new compositions of matter.

Those new reaction products which are characterized by relatively long-chain alkyl substituents — thus oil-soluble — and which are prepared by the method shown above, are of particular value as oil addition agents, the metal salts being especially efficient in this regard. They possess antioxidant properties and, thus, inhibit corrosion of metal alloy surfaces, such as cadmium-silver bearings and the like, when such surfaces are contacted with an oil containing a small amount of one or more of said reaction products. When used in oils, they also counteract and inhibit the formation of acidic materials, thereby extending the useful life of such oils. The aforesaid reaction products are further characterized by their capacity to inhibit the viscosity increase normally suffered by a lubricating oil during use and by their capacity to improve the viscosity index and lower the pour point of the oil. The aforesaid acidic, phosphorus- and sulfur-containing reaction products, as distinguished from their metal and amine salts, also improve the extreme pressure characteristics of oil fractions.

Improving action of the aforesaid type is illustrated by the following typical test results.

Pour point depressant action

The reaction products are shown to be effective pour point depressants, as indicated by the results provided in Table I, which were obtained with a motor oil having an A. S. T. M. pour point of +20° F.

TABLE I

| Improving Agent | Conc., Wt. Percent | A. S. T. M. Pour Test |
|---|---|---|
| | | °F. |
| None | | +20 |
| Product V | 1 | −15 |
| Product VII | 1 | −5 |

Viscosity index improvement

The oil-improving agents contemplated herein are effective to improve the viscosity index (V. I.) of various mineral oil fractions. This property is demonstrated by the data contained in Table II below, wherein the viscosity index was obtained in the conventional manner from the Saybolt viscosities of the oil and oil blends at 100° F. and 210° F. The oil used was a viscous oil of the lubricant type, having a S. U. V. of 141 seconds at 100° F.

TABLE II

| Improving Agent | Conc., Wt. Percent | V. I. |
|---|---|---|
| None | | 80.0 |
| Product II | 1 | 83.0 |
| Product IV | 1 | 83.0 |
| Product V | 1 | 84.2 |
| Product IX | 1 | 84.3 |

Corrosion inhibition

In this test, a section of a bearing containing a cadmium-silver alloy surface and weighing about 6.0 grams, was placed in 30 grams of a solvent-refined Pennsylvania oil of S. U. V. of 53 seconds at 210° F. The oil was heated to 175° C. for 22 hours while a stream of air was bubbled against the surface of the bearing. The loss in weight in milligrams of the bearing is indicative of the corrosiveness of the oil. In each case a sample of the oil containing the addition agent was run concurrently with a sample of straight oil. Each sample contained a section cut from the same bearing. The results are set forth in Table III below.

TABLE III

| Improving Agent | Conc., Wt. Per cent | Mgs. Loss in Wt. | |
|---|---|---|---|
| | | Inhibited | Uninhibited |
| Product II | ¼ | 0 | 23 |
| Do | ⅛ | 0 | 23 |
| Product IV | ¼ | 0 | 30 |
| Do | ⅛ | 0 | 30 |
| Product V | ¼ | 0 | 30 |
| Do | ⅛ | 0 | 30 |
| Product I | ¼ | 0 | 30 |
| Do | ⅛ | 0 | 30 |

Accelerated Underwood Corrosion Test results also demonstrate the inhibiting properties which characterize these improving agents. This test, described in a publication of the General Motors Research Laboratory, December 9, 1940, involves the following:

The apparatus consists of a circulating arrangement whereby oil at 325° F. under 10 lbs. pressure is sprayed against a standard cadmium-silver bearing for a period of either 5, 10 or 15 hours. The amount of oil in the system under constant circulation is 1,500 cc. and contains an accelerator, iron naphthenate (commercially designated as Nuodex, 6% $Fe_2O_3$). In passing through the system, the oil comes in contact with cast iron, steel, stainless steel, copper and the cadmium-silver bearing; and is also exposed to aeration. The oil used has an S. U. V. of 65 seconds at 210° F. and contains 0.17% Nuodex. The results are presented in Table IV below.

TABLE IV

| Improving Agent | Conc., Wt. Per cent | Hrs. | N. N. | Viscosity Bearings | |
|---|---|---|---|---|---|
| | | | | Incr., Per cent | Loss, grams |
| None | | 0 | 0.25 | | |
| Do | | 5 | 7.76 | 107 | 1.695 |
| Product V | 1 | 5 | 0.75 | 3 | 0.000 |
| | | 10 | 1.40 | 9 | 0.001 |
| | | 15 | 1.70 | 12.7 | 0.003 |
| Product VII | 1 | 5 | 0.47 | 0.7 | 0.000 |
| | | 10 | 0.80 | 6 | 0.000 |
| | | 15 | 0.95 | 8 | 0.001 |

*Operation test*

This test is the Lauson engine test which simulates automotive operating conditions. The tests were carried out in a single-cylinder Lauson engine operated continuously over a time interval of 36 hours with the cooling medium held at a temperature of about 212° F. and the oil temperature held at about 280° F. The engine was operated at a speed of about 1,830 R. P. M. At the end of the test, the oil was tested for acidity (N. N.) and viscosity. The oil used was a solvent-refined oil having a S. U. V. of 45 seconds at 210° F. The results are presented in Table V following.

TABLE V

| Improving Agent | Conc., Wt. Per cent | N. N. | Kv. @ 210° F. |
|---|---|---|---|
| None | | 8.7 | 9.03 |
| Product II | 1 | 2.0 | 6.22 |
| None | | 10.8 | 10.27 |
| Product V | 1 | 2.8 | 6.72 |
| None | | 7.9 | 8.50 |
| Product VII | 1 | 2.0 | 6.57 |

All of these improvements of hydrocarbon oil fractions can be obtained by incorporating small amounts, from about 0.1% to about 10%, in such oil fractions, the amount so used being influenced by the character of the oil fraction and the conditions under which it is to be used. In general, however, substantial improvement of said oil fractions can be realized by using from about 0.1% to about 2% in the oil fractions. The metal and amine salts, particularly those having low molecular weight alkyl substituents in the molecule may also be used as flotation agents. Other uses for the reaction products defined hereinabove will be apparent to those familiar with the art.

It is to be understood that the foregoing detailed procedures, specific reactants and specific reaction products described above are but illustrative of the invention, and that the invention is not restricted to such illustrations, rather it is to be construed broadly in the light of the language of the appended claims.

I claim:

1. An improved mineral oil composition comprising a viscous mineral oil fraction having in admixture therewith a minor proportion, sufficient to inhibit said oil fraction against the deleterious effects of oxidation, of an oil-soluble, acidic, phosphorus- and sulfur-containing reaction product obtained by: reacting an alkyl halide and a phosphorus sulfide in the presence of a Friedel-Crafts catalyst at an elevated temperature between about 125° C. and about 250° C.; and separating said acidic reaction product so formed from the reaction mixture obtained in the reaction.

2. An improved mineral oil composition comprising a viscous mineral oil fraction having in admixture therewith a minor proportion, sufficient to inhibit said oil fraction against the deleterious effects of oxidation, of an oil-soluble, acidic, phosphorus- and sulfur-containing reaction product obtained by: reacting an alkyl halide and a phosphorus sulfide in the presence of a Friedel-Crafts catalyst at an elevated temperature between about 150° C. and about 200° C.; and separating said acidic reaction product so formed from the reaction mixture obtained in the reaction.

3. An improved mineral oil composition comprising a viscous mineral oil fraction having in admixture therewith a minor proportion, sufficient to inhibit said oil fraction against the deleterious effects of oixdation, of an oil-soluble, acidic, phosphorus- and sulfur-containing reaction product obtained by: reacting an alkyl halide and a phosphorus sulfide in the presence of a Freidel-Crafts catalyst at an elevated temperature between about 125° C. and about 250° C., substantially ¼ mol of said phosphorus sulfide being used for each atom of halogen in said alkyl halide; and separating said acidic reaction product so formed from the reaction mixture obtained in the reaction.

4. An improved mineral oil composition comprising a viscous mineral oil fraction having in admixture therewith a minor proportion, sufficient to inhibit said oil fraction against the deleterious effects of oxidation, of an oil-soluble, acidic, phosphorus- and sulfur-containing reaction product obtained by: reacting a long-chain alkyl halide and a phosphorus sulfide in the presence of a Friedel-Crafts catalyst at an elevated temperature between about 125° C. and about 250° C.; and separating said acidic reaction product so formed from the reaction mixture obtained in the reaction.

5. An improved mineral oil composition comprising a viscous mineral oil fraction having in admixture therewith a minor proportion, sufficient to inhibit said oil fraction against the deleterious effects of oxidation, of an oil-soluble, acidic, phosphorus- and sulfur-containing reaction product obtained by: reacting a halogenated paraffin wax and a phosphorus sulfide in the presence of a Friedel-Crafts catalyst at an elevated temperature between about 125° C. and about 250° C.; and separating said acidic reaction product so formed from the reaction mixture obtained in the reaction.

6. An improved mineral oil composition comprising a viscous mineral oil fraction having in admixture therewith a minor proportion, sufficient to inhibit said oil fraction against the deleterious effects of oxidation, of an oil-soluble, acidic, phosphorus- and sulfur-containing reaction product obtained by: reacting a long-chain alkyl halide and phosphorus pentasulfide in the presence of a Friedel-Crafts catalyst at an elevated temperature between about 125° C. and about 250° C.; and separating said acidic reaction product so formed from the reaction mixture obtained in the reaction.

7. An improved mineral oil composition comprising a viscous mineral oil fraction having in admixture therewith a minor proportion, sufficient to inhibit said oil fraction against the deleterious effects of oxidiation, of an oil-soluble, acidic, phosphorus- and sulfur-containing reaction product obtained by: reacting a halogenated paraffin wax with phosphorus pentasulfide in the presence of $AlCl_3$ at about 200° C.; and separating said acidic reaction product so formed from the reaction mixture obtained in the reaction.

8. An improved mineral oil composition comprising a viscous mineral oil fraction having in admixture therewith a minor proportion, sufficient to inhibit said oil fraction against the deleterious effects of oxidation, of a salt of an acidic, phosphorus- and sulfur-containing reaction product obtained by: reacting an alkyl halide and a phosphorus sulfide in the presence of a Friedel-Crafts catalyst at an elevated temperature between about 125° C. and about 250° C.; separating said acidic reaction product so formed from the reaction mixture obtained in the first-mentioned operation; and converting said acidic reaction product to a corresponding salt thereof.

9. An improved mineral oil composition comprising a viscous mineral oil fraction having in admixture therewith a minor proportion, sufficient to inhibit said oil fraction against the deleterious effects of oxidation, of a salt of an acidic, phosphorus- and sulfur-containing reaction product obtained by: reacting a long-chain alkyl halide and a phosphorus sulfide in the presence of a Friedel-Crafts catalyst at an elevated temperature between about 125° C. and about 250° C.; separating said acidic reaction product so formed from the reaction mixture obtained in the first-mentioned operation; and converting said acidic reaction product to a corresponding salt thereof.

10. An improved mineral oil composition comprising a viscous mineral oil fraction having in admixture therewith a minor proportion, sufficient to inhibit said oil fraction against the deleterious effects of oxidation, of a metal salt of an acidic, phosphorus- and sulfur-containing reaction product obtained by: reacting an alkyl halide and a phosphorus sulfide in the presence of a Friedel-Crafts catalyst at an elevated temperature between about 125° C. and about 250° C.; separating said acidic reaction product so formed from the reaction mixture obtained in the first-mentioned operation; and converting said acidic reaction product to a corresponding metal salt thereof.

11. An improved mineral oil composition comprising a viscous mineral oil fraction having in admixture therewith a minor proportion, sufficient to inhibit said oil fraction against the deleterious effects of oxidation, of a barium salt of an acidic, phosphorus- and sulfur-containing reaction product obtained by: reacting an alkyl halide and a phosphorus sulfide in the presence of a Friedel-Crafts catalyst at an elevated temperature between about 125° C. and about 250° C.; separating said acidic reaction product so formed from the reaction mixture obtained in the first-mentioned operation; and converting said acidic reaction product to a corresponding barium salt thereof.

12. An improved mineral oil composition comprising a viscous mineral oil fraction having in admixture therewith a minor proportion, sufficient to inhibit said oil fraction against the deleterious effects of oxidation, of a salt of an acidic, phosphorus- and sulfur-containing reaction product obtained by: reacting a crude monochlorowax with phosphorus pentasulfide in the presence of about 1 per cent by weight of $AlCl_3$ (based upon the weight of said crude monochlorowax) at about 200° C. for about seven hours, substantially ¼ mol of said phosphorus pentasulfide being used for each atom of chlorine in said crude monochlorowax; separating said acidic reaction product so formed from the reaction mixture obtained in the first-mentioned operation; and converting said acidic reaction product to a corresponding barium salt thereof.

13. An improved mineral oil composition comprising a viscous mineral oil fraction having in admixture therewith a minor proportion, sufficient to inhibit said oil fraction against the deleterious effects of oxidation, of an ammonium salt of an acidic, phosphorus- and sulfur-containing reaction product obtained by: reacting an alkyl halide and a phosphorus sulfide in the presence of a Friedel-Crafts catalyst at an elevated temperature between about 125° C. and about 250° C., separating said acidic reaction product so formed from the reaction mixture obtained in the first-mentioned operation; and converting said acidic reaction product to a corresponding ammonium salt thereof.

14. An improved mineral oil composition comprising a viscous mineral oil fraction having in admixture therewith a minor proportion, sufficient to inhibit said oil fraction against the deleterious effects of oxidation, of an amine salt of an acidic, phosphorus- and sulfur-containing reaction product obtained by: reacting an alkyl halide and a phosphorus sulfide in the presence of a Friedel-Crafts catalyst at an elevated temperature between about 125° C. and about 250° C.; separating said acidic reaction product so formed from the reaction mixture obtained in the first-mentioned operation; and converting said acidic reaction product to a corresponding amine salt thereof.

JOHN J. GIAMMARIA.

REFERENCES CITED

The following references are of record in the file of this patent:

UNITED STATES PATENTS

| Number | Name | Date |
|---|---|---|
| 2,176,884 | Butz | Oct. 24, 1939 |
| 2,307,183 | Zimmer | Jan. 5, 1943 |
| 2,316,086 | MacLaren | Apr. 6, 1943 |
| 2,338,829 | Werntz | Jan. 11, 1944 |
| 2,367,468 | Mixon | Jan. 16, 1945 |

Certificate of Correction

Patent No. 2,449,934.

September 21, 1948.

JOHN J. GIAMMARIA

It is hereby certified that errors appear in the printed specification of the above numbered patent requiring correction as follows:

Column 6, line 73, Table III, for "Product I" read *Product IX*; column 8, line 38, for "oixdation" read *oxidation*; column 9, line 17, for "oxidiation" read *oxidation*; and that the said Letters Patent should be read with these corrections therein that the same may conform to the record of the case in the Patent Office.

Signed and sealed this 10th day of May, A. D. 1949.

[SEAL]

THOMAS F. MURPHY,
*Assistant Commissioner of Patents.*